June 12, 1934.  A. T. McWANE  1,962,400
PIPE JOINT
Original Filed March 4, 1932   2 Sheets-Sheet 1
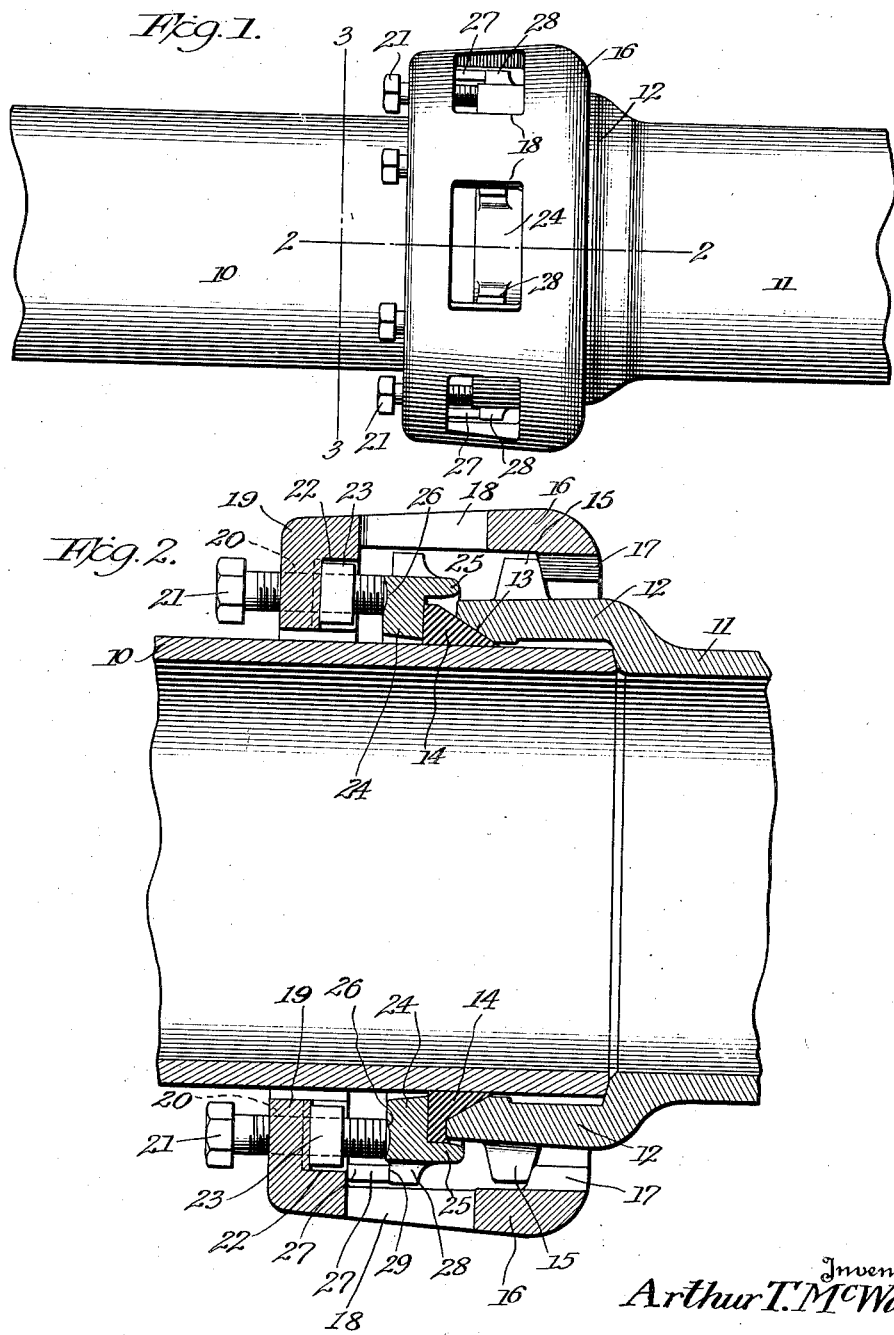
Inventor
Arthur T. McWane
By Philip P. Siggers
Attorney June 12, 1934. A. T. McWANE 1,962,400
PIPE JOINT
Original Filed March 4, 1932 2 Sheets-Sheet 2
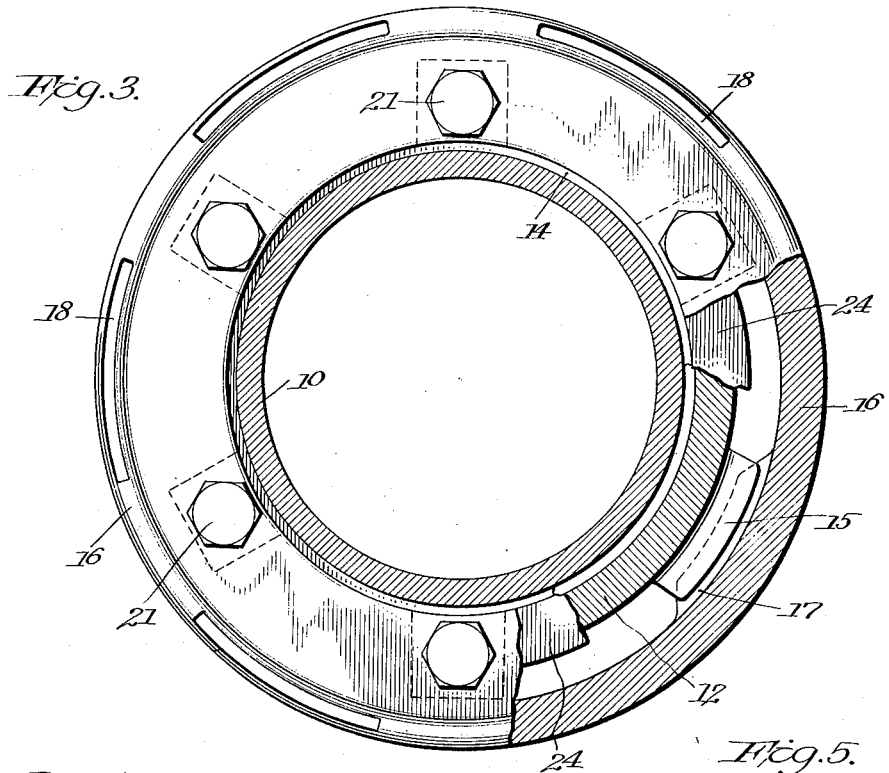
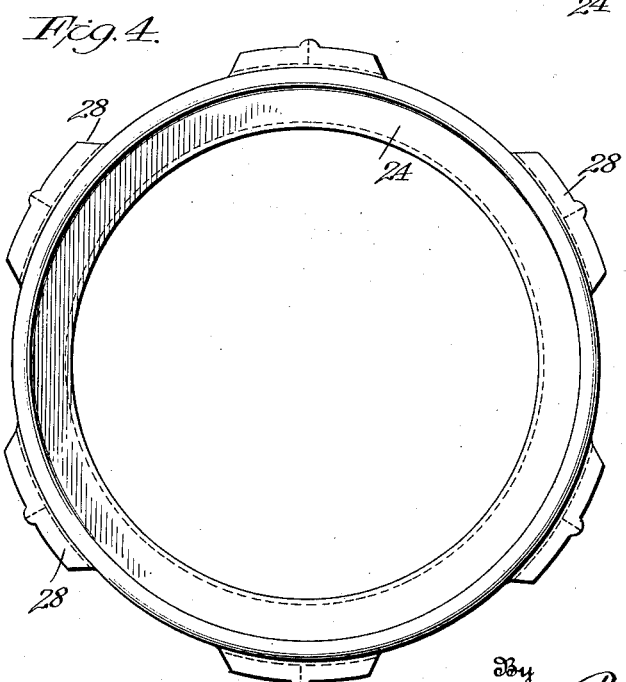
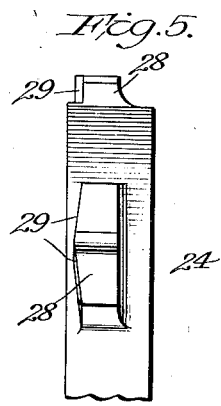
Arthur T. McWane, Inventor Patented June 12, 1934

1,962,400

UNITED STATES PATENT OFFICE 1,962,400

PIPE JOINT

Arthur T. McWane, Birmingham, Ala., assignor to McWane Cast Iron Pipe Company, Birmingham, Ala., a corporation of Alabama Application March 4, 1932, Serial No. 596,841
Renewed November 1, 1933

11 Claims. (Cl. 285—134)

This invention relates to pipe joints and, among other objects, aims to provide an improved clam-type joint for bell and spigot cast iron pipes and the like, which is relatively simple, employs light and durable clamping members for a rubber packing or the like, and is readily assembled in the field. The invention is also characterized by the elimination of expensive machine operations on the parts and by the employment of a pair of ring members which are adapted to be slipped over the spigot end of a pipe and thereafter assembled on and locked to the bell of an adjacent, alined pipe section to clamp the packing in place by means of screws or bolts.

Other aims and advantages of the invention will appear in the specification, when considered in connection with the accompanying drawings, wherein:—

Fig. 1 is a side elevation of one form of joint embodying the invention;

Fig. 2 is a sectional view taken on the line 2—2 in Fig. 1;

Fig. 3 is another sectional view taken on the line 3—3 in Fig. 1;

Fig. 4 is a rear end view of a follower ring shown in Fig. 2;

Fig. 5 is a fragmentary side elevation of the follower ring; and

Fig. 6 is an edge view of a wedge adapted to be used to hold the parts assembled.

Referring particularly to the drawings, the form of joint there shown is applied to cast iron pipe sections 10 and 11 wherein a ground spigot is inserted in a bell 12 which has a machined surface 13 to receive a rubber packing ring 14 which is wedge-shaped in cross-section, as clearly shown in Fig. 2. Various forms of packing clamps or glands have heretofore been employed for compressing such packing between the spigot and the machined face of the bell. In this instance, however, there is shown a greatly simplified form of clamp which co-operates directly with and interlocks with the bell.

Referring to Fig. 2, the bell 12 is shown as having a series of arcuate spaced lugs 15 cast integrally with it and of such shape as to provide ample draft. Any number of such lugs may be formed on the bell, but, in this instance, six are shown and they are all approximately equally spaced. A cast iron ring 16 in the form of a sleeve is shown as being secured to the bell by means of segmental, inwardly projecting lugs 17 which are spaced to correspond with the spaces between the lugs 15 so that the sleeve may be interlocked by a partial rotation after its lugs 17 have passed axially through the openings or spacers between the lugs 15 on the bell.

As shown in Figs. 1 and 2, the sleeve 16 projects beyond the end of the bell and has a series of radial openings 18 not only to reduce the weight of the sleeve but to afford access to the inside of the sleeve when it is applied, and also spaces through which clamping wedges may be driven, as will later be explained. The projecting end of the sleeve 16 has an integral inwardly extending flange 19 which terminates short of the outer wall of the spigot to permit relative deflection of the pipe sections. This flange is shown as having a series of cored openings 20 through which bolts 21 may be inserted, and at the inner ends of the cored openings, nut-receiving sockets 22 are also provided to carry noncircular nuts 23, the shape of the sockets corresponding with the shape of the nuts to prevent rotation of the nuts, so that the nuts may be utilized instead of tapped holes through the flange to tighten the bolts against a follower ring 24. The follower ring is shown as being L-shaped in cross section, having a forwardly projecting flange 25 which is adapted to overlap the end of the bell and serves to reinforce the follower ring as well as to protect the compressed rubber gasket 14. The follower ring is also slightly larger in internal diameter than the spigot so as to permit relative deflection of the pipe sections. In this instance, the ring 24 has depressions 26 for the rounded ends of the bolts and there are as many bolts as there are openings 18 in the sleeve. Of course, the number of bolts to be employed will depend largely upon their size and the size of the pipe sections as well as the amount of compression required for the packing.

If bolts, alone, are employed for applying clamping pressure to the follower ring and holding the gasket compressed, ordinary steel bolts may be inserted in the cored openings, one at a time, and threaded through the nuts which are held in the nut sockets at the inner ends of the cored openings until the end of each bolt is seated in its depression in the follower ring. This may be done by hand. The bolts are all tightened by means of an ordinary socket wrench, each one being turned a few rounds at a time so as to distribute the pressure uniformly around the ring and against the gasket. Practical tests have demonstrated that adequate pressure may be applied by using a ten inch socket wrench on six ⅝ inch bolts for six inch pipe to withstand more than 90 lb. of air pressure without leakage. While the steel bolts may be left in place, preferably they will be replaced, one at a time, by bolts made of rust-proof material or ordinary cast iron bolts which will not rust as rapidly as steel.

In the preferred form of joint, cast iron wedges 27 are employed so that the bolts may be removed if desired. For this purpose, the follower ring 24 is shown as having a series of integral lugs 28 providing compound beveled faces 29 for the wedges. Likewise, the inside face of the flange 19 may be correspondingly shaped bevel faces for the wedges, the arrangement being such that the wedges 27 may be inserted and driven into wedging engagement through the radial openings 18. While the wedges may be of any desired shape, they are shown in Fig. 6 as being arcuate. They are preferably made of cast iron or some other relatively cheap non-rusting metal. Neither the wedges nor the wedge-engaging faces of the flange and follower ring require any machining or finishing. In fact, rough edges seem to work better because then the wedges have less tendency to back out or to become loose. The wedges are inserted and tightened by light hammer blows after adequate pressure has been applied by the bolts and before the bolts are removed. They serve to maintain the pressure exerted by tightening the bolts and it is not necessary to drive them hard.

When the wedges alone are employed, it will be understood that, if desired, a single set of steel clamping bolts may be used for applying pressure to a series of joints, since the bolts are removed at the time the wedges are driven into position. Incidentally, the nuts 23 may also be removed, if desired, by making the sockets open through the outside of the sleeve. After all of the wedges are applied, the bolts and/or nuts may be removed, or left in place if it is desired to have this additional safeguard.

The spaced lugs 28 on the follower ring 24 are so arranged that the follower ring may be inserted in the sleeve 16, the lugs 28 passing through the gaps or spaces between the lugs 17 on the sleeve. The sleeve and the follower ring are then placed on the end of the spigot 10, the rubber gasket 14 is applied, and the spigot is then ready to be inserted in the bell and the joint assembled, as has already been described.

From the foregoing description, it will be seen that the parts constituting the joint clamp require no machine operations whatever. They may be made of a good, cheap grade of cast-iron or other cheap metal having adequate strength and the weight may be reduced to a minimum, consistent with the pressure that the parts are required to withstand. The simplified form of lugs, cast on the bells of the pipe sections, likewise require no machining and can be produced at practically no added expense. Moreover, the parts are very easily applied to all sizes of pipe and the joints may be completed either while the pipe is in a trench or on the surface. There are no irregular protruding parts which prevent the jointed pipe from being rolled into place.

Practical tests have demonstrated that joints of this type will withstand enormous pressure, far exceeding that required of ordinary high pressure gas pipes and water mains. In testing, no leak was developed when one pipe section was repeatedly moved axially with respect to the other a distance greater than the amount of movement which occurs due to thermal expansion and contraction. In another test, the pipe sections at the joint were deflected laterally ½ inch between three foot centers or supports on opposite sides of the joint, and no leak was developed. Thus, sections of the pipe may be assembled to make the joint and the joined sections transported or the joints may be made in the field and the pipe sections rolled into place, without injury to the joints. Due to the great clamping pressure that it is possible to apply on this type of joint, it is entirely feasible to use rough spigots to make emergency repairs. Tests have also demonstrated that such a joint is entirely practicable. However, the smooth or ground spigots are recommended for long service.

This application is a companion to application Serial No. 596842 filed March 4, 1932.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A bell and spigot pipe joint comprising, in combination, a compressible packing ring between the bell and the spigot; a follower ring on the spigot; said follower ring having radially projecting lugs; a flanged sleeve surrounding the follower ring and removably interlocked with the bell; and a series of wedges interposed between the sleeve and the lugs on the follower ring and arranged to exert clamping pressure on the packing ring.

2. A bell and spigot pipe joint comprising, in combination, a packing ring between the bell and spigot; a cast metal follower ring on the spigot; a series of integral lugs formed on the bell; a flanged sleeve member having inwardly projecting lugs interlocked with the lugs on the bell; said sleeve member having a series of openings in the flange beyond the follower ring; and a plurality of bolts extending through said openings and arranged to exert clamping pressure on the packing ring.

3. In a bell and spigot joint for cast iron pipes and the like, a deformable packing ring of substantially wedge-shaped cross-section between the bell and the spigot; a follower ring on the spigot engaging said packing ring and having a flange adapted to overlap the end of the bell; a substantially cylindrical clamping member providing a jacket around the joint and having a series of spaced, inwardly projecting lugs; a series of lugs formed on the bell interlocking with the said inwardly projecting lugs; an annular, inwardly projecting flange on the other end of said clamping member, said flange having a series of openings and non-circular sockets therein; non-circular nuts in said sockets; and a series of bolts extending through said openings and threaded through said nuts having their ends engaging the follower ring to transmit clamping pressure to the packing ring.

4. A bell and spigot joint for cast iron pipe and the like comprising, in combination, a packing ring of substantially wedge-shaped cross-section arranged between the spigot and the bell; a rough, cast metal follower ring on the spigot engaging the packing ring; a substantially cylindrical clamping member surrounding the bell and the spigot; a plurality of spaced lugs cast integral with the bell; a plurality of spaced, inwardly projecting lugs on the clamping member removably interlocked with the lugs on the bell; a flange on the opposite end of the clamping member arranged beyond the follower ring; said flange having a series of rough cored openings and nut-receiving pockets therein; a series of non-circular nuts held against rotation in the nut-receiving pockets; and a plurality of bolts adapted to be tightened to transmit clamping pressure through the follower ring to said packing ring.

5. In a bell and spigot joint for cast iron pipes and the like, a deformable packing ring between the bell and the spigot; a follower ring on the spigot; a flanged, substantially cylindrical clamping member removably interlocked with the bell; a series of bolts removably mounted in the flange of said clamping member and arranged to transmit clamping pressure through the follower ring to the packing ring; said clamping member having a series of radial openings; integral lugs on the packing ring presenting angular faces opposite the inner face of the flange on the clamping member; and a plurality of wedges driven between the wedge faces and the flange on the clamping member to hold the follower ring compressed and permit removal of said bolts.

6. In a bell and spigot pipe joint of the character described, a packing ring adapted to be clamped between the bell and spigot; a clamping sleeve removably interlocked at one end with the bell; an inwardly extending flange on the other end of the sleeve beyond the packing; a follower ring between the packing and said inwardly extending flange; and a series of wedges between said flange and said follower ring to hold the packing compressed in the bell.

7. In a bell and spigot pipe joint of the character described, a series of spaced, tapered lugs cast on the bell; a clamping sleeve member interlocked with said lugs; an inwardly projecting annular flange on the opposite end of said clamping sleeve member; and means associated with said flange to compress a packing between the bell and the spigot.

8. In a bell and spigot pipe joint of the class described, a sleeve member removably interlocked with the bell; an inwardly projecting annular flange on the opposite end of the sleeve member beyond the end of the bell; packing means between said flange and the mouth of the bell; a follower ring surrounding the spigot and engaging the packing means on the outside; and a series of wedges coacting with said flange and follower ring to hold the packing compressed in the bell; said sleeve member having a series of openings through which the wedges may be inserted for positioning between the flange and follower ring.

9. In a bell and spigot pipe joint, the combination with a spigot of a bell having a series of radially projecting lugs on the outside wall; a sleeve surrounding the bell and projecting beyond the end thereof and so shaped as to leave a space between its end and the end of the bell, said sleeve having means engaging said lugs; a packing member surrounding the spigot and sealing the bell; and means interposed between the sleeve and the packing ring to transmit compression stresses to said ring thereby to maintain a tight seal.

10. In combination, a generally cylindrical sleeve having a substantially radial flange; means on the sleeve spaced longitudinally from said radial flange and adapted to engage a radial projection on a pipe bell; a follower ring; a series of wedges interposed between the radial flange and the follower ring; the follower ring having a series of integral lugs providing compound beveled faces for the wedges and the inside face of the radial flange also having compound beveled faces for the opposite ends of the wedges.

11. In combination, a generally cylindrical sleeve having a substantially radial flange and a series of openings in the cylindrical wall; means on the sleeve spaced longitudinally from said radial flange and adapted to engage a radial projection on a pipe bell; a follower ring; a series of arcuate wedges interposed between the radial flange and the follower ring and adapted to be inserted and driven home through the openings in the sleeve; the follower ring having a series of integral lugs providing compound beveled faces for the wedges and the inside face of the radial flange also having compound beveled faces for the opposite ends of the wedges.

ARTHUR T. McWANE.